(12) United States Patent
Chen et al.

(10) Patent No.: US 7,017,875 B2
(45) Date of Patent: Mar. 28, 2006

(54) MOUNTING BRACKET FOR DISK DRIVE

(75) Inventors: Li Ping Chen, Tu-chen (TW); Yuan-Lin Hsu, Tu-chen (TW)

(73) Assignee: Hon Hai Precision Ind. Co., LTD, Taipei Hsien (TW)

( * ) Notice: Subject to any disclaimer, the term of this patent is extended or adjusted under 35 U.S.C. 154(b) by 0 days.

(21) Appl. No.: 10/643,557

(22) Filed: Aug. 18, 2003

(65) Prior Publication Data

US 2004/0113034 A1    Jun. 17, 2004

(30) Foreign Application Priority Data

Dec. 13, 2002    (TW) .............................. 91220204 U

(51) Int. Cl.
*A47H 1/10*    (2006.01)
(52) U.S. Cl. ...................... 248/300; 361/685; 361/724
(58) Field of Classification Search ................ 248/300, 248/248; 361/683–686, 724, 725, 728, 747; 211/26; 312/223.1, 223.2
See application file for complete search history.

(56) References Cited

U.S. PATENT DOCUMENTS

| | | | | |
|---|---|---|---|---|
| 2,958,496 A | * | 11/1960 | Hawkin | 248/311.2 |
| 3,182,807 A | * | 5/1965 | Root | 211/49.1 |
| 3,202,291 A | * | 8/1965 | Root | 211/49.1 |
| 6,418,012 B1 | * | 7/2002 | Dials et al. | 361/685 |
| 6,529,373 B1 | * | 3/2003 | Liao et al. | 361/685 |
| 6,621,695 B1 | * | 9/2003 | Chen et al. | 361/685 |
| 6,628,514 B1 | * | 9/2003 | Chen | 361/685 |
| 6,628,515 B1 | * | 9/2003 | Chen et al. | 361/685 |
| 2002/0080573 A1 | * | 6/2002 | Sheng-Hsiung et al. | 361/685 |
| 2003/0090868 A1 | * | 5/2003 | Chen et al. | 361/685 |
| 2004/0047122 A1 | * | 3/2004 | Chen et al. | 361/685 |

FOREIGN PATENT DOCUMENTS

| | | |
|---|---|---|
| TW | 82202204 | 8/1993 |
| TW | 83202972 | 9/1994 |

* cited by examiner

*Primary Examiner*—Korie Chan
(74) *Attorney, Agent, or Firm*—Wei Te Chung

(57) ABSTRACT

A mounting bracket (10) for holding a disk drive (30) includes a bottom wall (12), a first sidewall (14) extending upwardly from one side of the bottom wall with two locating pins (16) protruding inwardly therefrom corresponding to two fixing holes defined in a sidewall of the disk drive, a second sidewall extending upwardly from an opposite side of said bottom wall for sandwiching the disk drive with the first sidewall, and locking means for engaging with a second sidewall of the disk drive to retain the disk drive in the mounting bracket. In assembly, the disk drive is placed in the mounting bracket, and the locating pines are inserted into the fixing holes of the disk drive. With the other sidewall of the disk drive secured to the fixing structures of the mounting bracket, the disk drive is secured in the mounting bracket.

6 Claims, 5 Drawing Sheets

MOUNTING BRACKET FOR DISK DRIVE

BACKGROUND OF THE INVENTION

1. Field of the Invention

The present invention relates to mounting brackets, and particularly to a mounting bracket for mounting a disk drive to a computer enclosure.

2. Description of Related Art

In the enclosure of a typical personal computer, there are generally data storage devices such as CD-ROM drives, floppy disk drives (FDDs) and hard disk drives (HDDs) mounted therein. These data storage devices are generally fixedly received in brackets within an enclosure of the computer.

To fix a data storage device such as a disk drive in an enclosure, a mounting bracket is usually installed in the enclosure first. Then the disk drive is fixed in the mounting bracket. This kind of conventional assembly process is unduly laborious and slow. In mass-production facilities, the assembly process is liable to slow up a production line and lead to inefficiency and increased costs.

To overcome these difficulties, an alternative conventional assembly means comprises: firstly, fixing the disk drive in the mounting bracket to form a mounting bracket assembly; and then installing the mounting bracket assembly in the enclosure.

There are numerous kinds of conventional mounting bracket assemblies. These generally include using a quantity of screws to fix the disk drive in the mounting bracket, or alternatively fixing guiding rails on the disk drive and then slidingly inserting the disk drive into the mounting bracket. However, using a quantity of screws adds to component parts and costs. In addition, fastening or detachment of the screws using a tool is unduly laborious and time-consuming. Similarly, screws are generally needed to fixing the guiding rails on the disk drive. Furthermore, using guiding rails usually creates spaces between the disk drive and the mounting bracket. Electromagnetic radiation is liable to leak out from the mounting bracket and generate a lot of static electricity in the enclosure.

Examples of conventional data storage device fastening structures are found in Taiwan Patent Application Nos. 82202204 and 83202927.

An improved mounting bracket which overcomes the above-mentioned problems is desired.

BRIEF SUMMARY OF THE INVENTION

Accordingly, an object of the present invention is to provide a mounting bracket that can conveniently receive data storage devices therein.

Another object of the present invention is to provide a mounting bracket that has good grounding.

To achieve the above-mentioned objects, a mounting bracket for holding a disk drive includes a bottom wall, a first sidewall extending upwardly from a border of the bottom wall with two locating pins protruding inwardly therefrom corresponding to two fixing holes defined in a sidewall of the disk drive, a second sidewall extending upwardly from an opposite border of said bottom wall for sandwiching the disk drive with the first sidewall, and locking means for engaging with a second sidewall of the disk drive to retain the disk drive in the mounting bracket. In assembly, the disk drive is placed in the mounting bracket, and the locating pines are inserted into the fixing holes of the disk drive. With the other sidewall of the disk drive secured to the fixing structures of the mounting bracket, the disk drive is secured in the mounting bracket.

Other objects, advantages and novel features of the present invention will be drawn from the following detailed description of a preferred embodiment of the present invention with the attached drawings, in which:

DETAILED DESCRIPTION OF THE INVENTION

Figure 1:
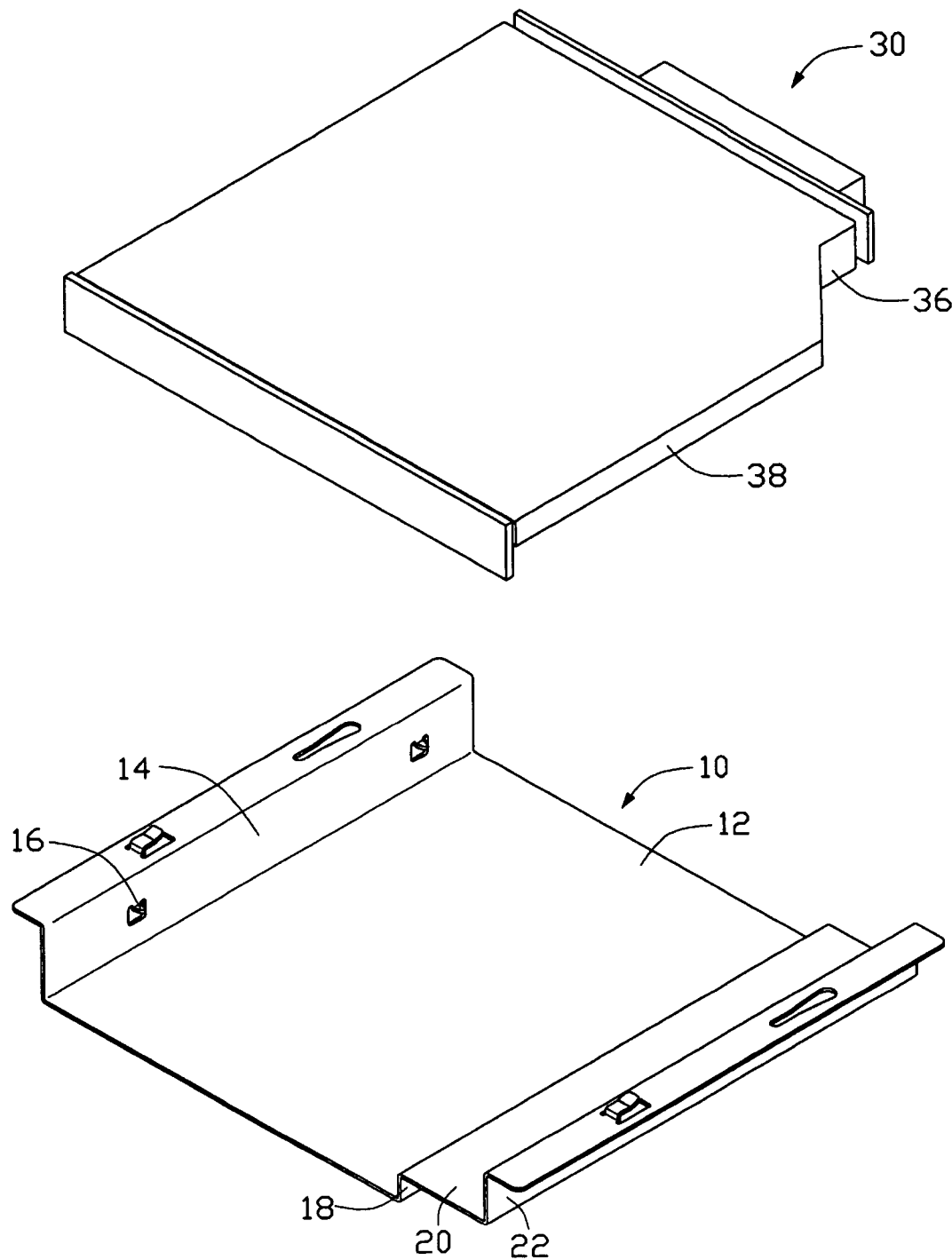
FIG. 1 is an isometric view of a mounting bracket in accordance with a preferred embodiment of the present invention, together with a disk drive ready to be received in the mounting bracket.
Figure 2:
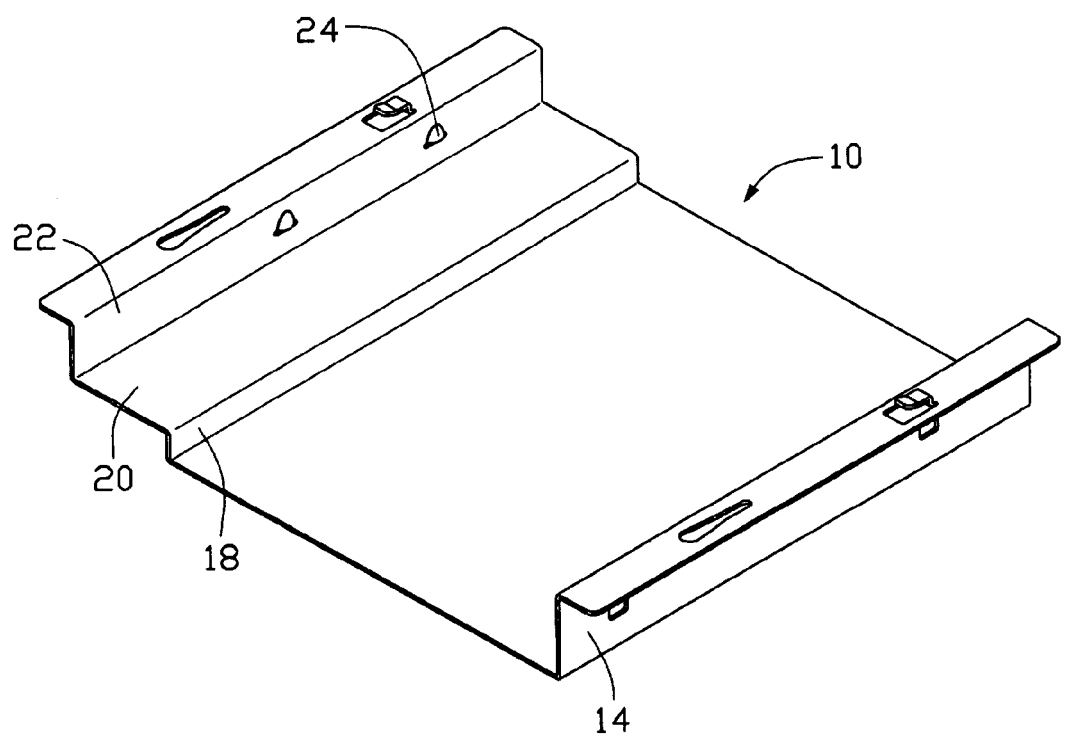
FIG. 2 is an isometric view of the mounting bracket of FIG. 1, but viewed from another aspect.

Referring to FIGS. 1 and 2, a mounting bracket 10 in accordance with the preferred embodiment of the present invention is for securing a disk drive 30 therein. The mounting bracket 10 comprises a bottom wall 12, a first sidewall 14 extending perpendicularly from an edge of the bottom wall 12, and two locating pins 16 protruding inwardly from the first sidewall 14. A second sidewall (not labeled) extends perpendicularly from an opposite edge of the bottom wall 12. The second sidewall comprises a first vertical wall 18, a horizontal connecting wall 20, and a second vertical wall 22. Two generally triangular protrusions 24 protrude inwardly from the second vertical wall 22.

A first sidewall (not visible) of the disk drive 30 defines two fixing holes (not visible) corresponding to the locating pins 16 of the mounting bracket 10. A second sidewall (not labeled) of the disk drive 30 comprises a recessed lower first wall 36, and a protruding upper second wall 38. The first wall 36 of the disk drive 30 defines two fixing holes (not visible) therein, and reference is made to the alternative embodiment of the invention described below in this regard.

Figure 3:
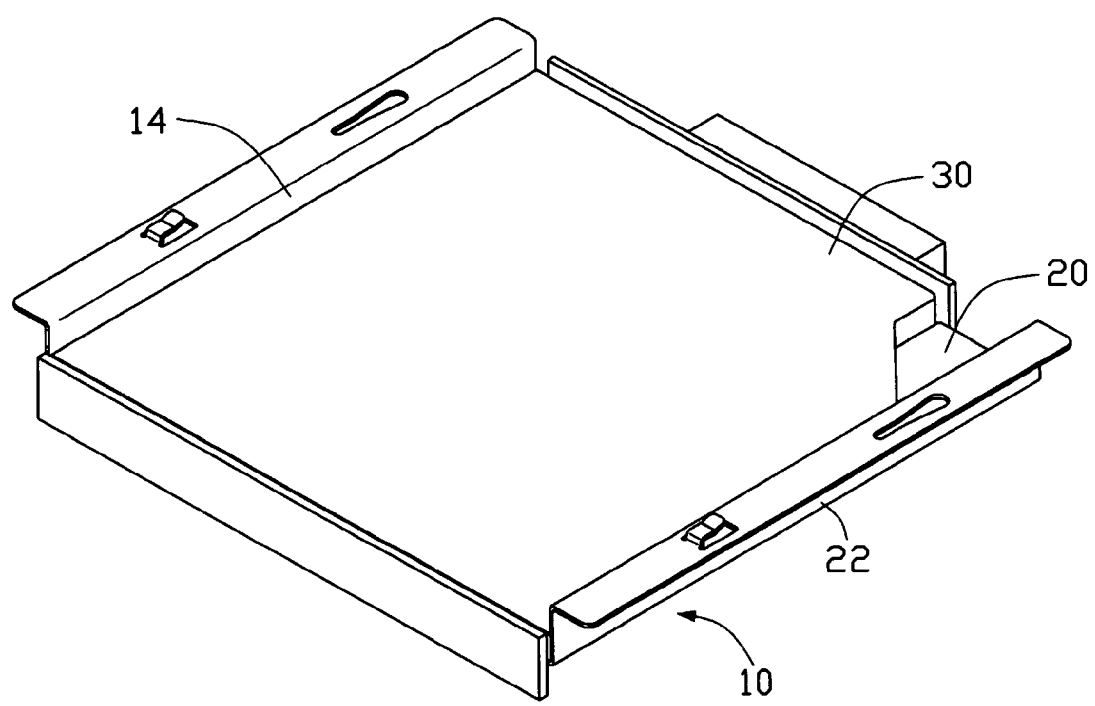
FIG. 3 is an assembled view of FIG. 1.

Referring also to FIG. 3, in assembly, the disk drive 30 is placed in the mounting bracket 10, and the locating pins 16 of the mounting bracket 10 are inserted into the fixing holes of the disk drive 30. A top of the disk drive 30 near the second sidewall is pressed until the second wall 38 of the disk drive 30 rides over and is engaged under the protrusions 24 of the second vertical wall 22. In this position, the first wall 36 abuts the first vertical wall 18. Thus, the disk drive 30 is securely received in the mounting bracket 10. Electromagnetic radiation is not liable to leak out from the mounting bracket 10 since the first sidewall of the disk drive 30 abuts the first sidewall 14 of the mounting bracket 10, the first wall 36 of the disk drive 30 abuts the first vertical wall 18 of the mounting bracket 10, and the second wall 38 of the disk drive 30 abuts the second vertical wall 22 of the mounting bracket 10.

Figure 4:
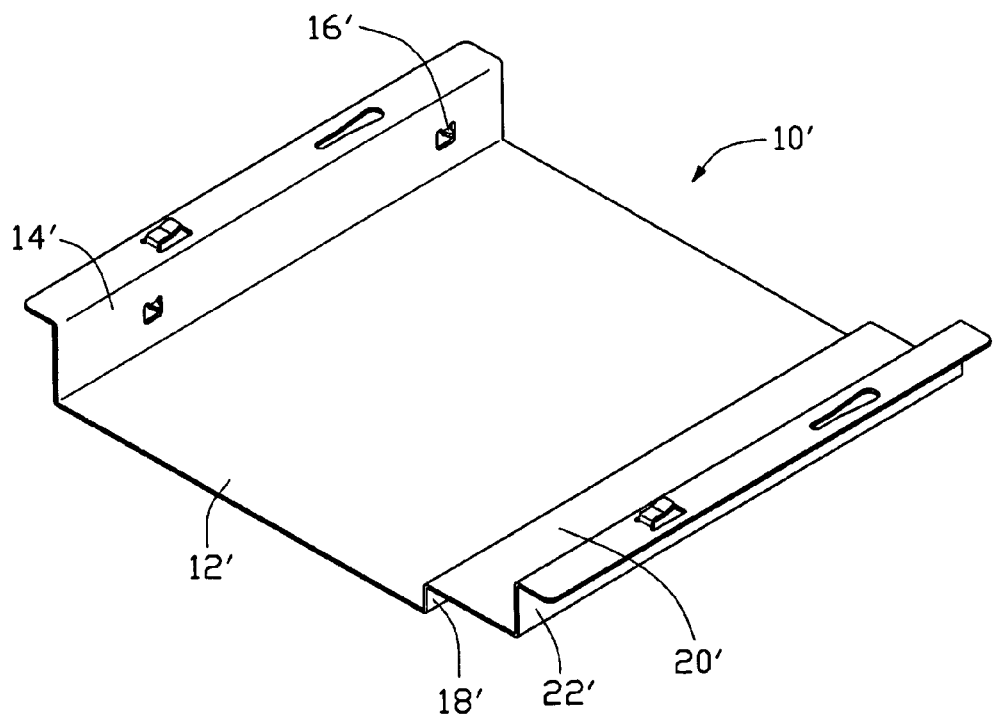
FIG. 4 is an isometric view of a mounting bracket in accordance with an alternative embodiment of the present invention.
Figure 5:
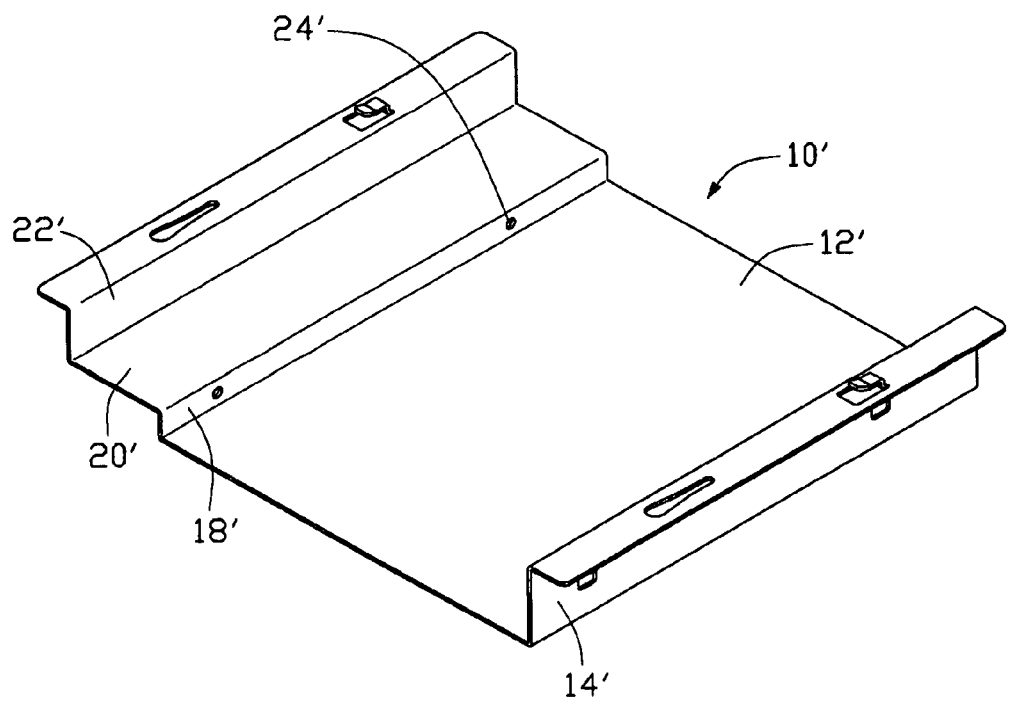
FIG. 5 is an isometric view of the mounting bracket of FIG. 4, but viewed from another aspect.

FIGS. 4 and 5 show a mounting bracket 10' in accordance with the alternative embodiment of the present invention. The mounting bracket 10' comprises a bottom wall 12', a first sidewall 14' extending perpendicularly from an edge of the bottom wall 12', and two locating pins 16' protruding inwardly from the first sidewall 14'. A second sidewall (not labeled) extends perpendicularly from an opposite edge of the bottom wall 12'. The second sidewall comprises a first vertical wall 18', a horizontal connecting wall 20', and a second vertical wall 22'. Two through holes 24' are defined in the first vertical wall 18'. The fixing holes (not visible) of the first wall 36 of the disk drive 30 correspond to the through holes 24' of the mounting bracket 10'.

In assembly, the disk drive 30 is placed in the mounting bracket 10', and the locating pins 16' of the mounting bracket 10' are inserted into the fixing holes of the first sidewall of the disk drive 30. A top of the disk drive 30 near the second sidewall is pressed until the second wall 38 of the disk drive 30 abuts the second vertical wall 22' of the mounting bracket 10', and the first wall 36 of the disk drive 30 abuts the first vertical wall 18' of the mounting bracket 10'. In this position, the fixing holes of the first wall 36 of the disk drive 30 are aligned with the corresponding through holes 24' of the first vertical wall 22' of the mounting bracket 10' respectively. Fasteners such as screws are extended through the through holes 24' and engaged in the corresponding fixing holes of the disk drive 30, thereby securing the disk drive 30 in the mounting bracket 10'. Electromagnetic radiation is not liable to leak out from the mounting bracket 10' since the first sidewall of the disk drive 30 abuts the first sidewall 14' of the mounting bracket 10', the first wall 36 of the disk drive 30 abuts the first vertical wall 18' of the mounting bracket 10', and the second wall 38 of the disk drive 30 abuts the second vertical wall 22' of the mounting bracket 10'.

Figure 6:
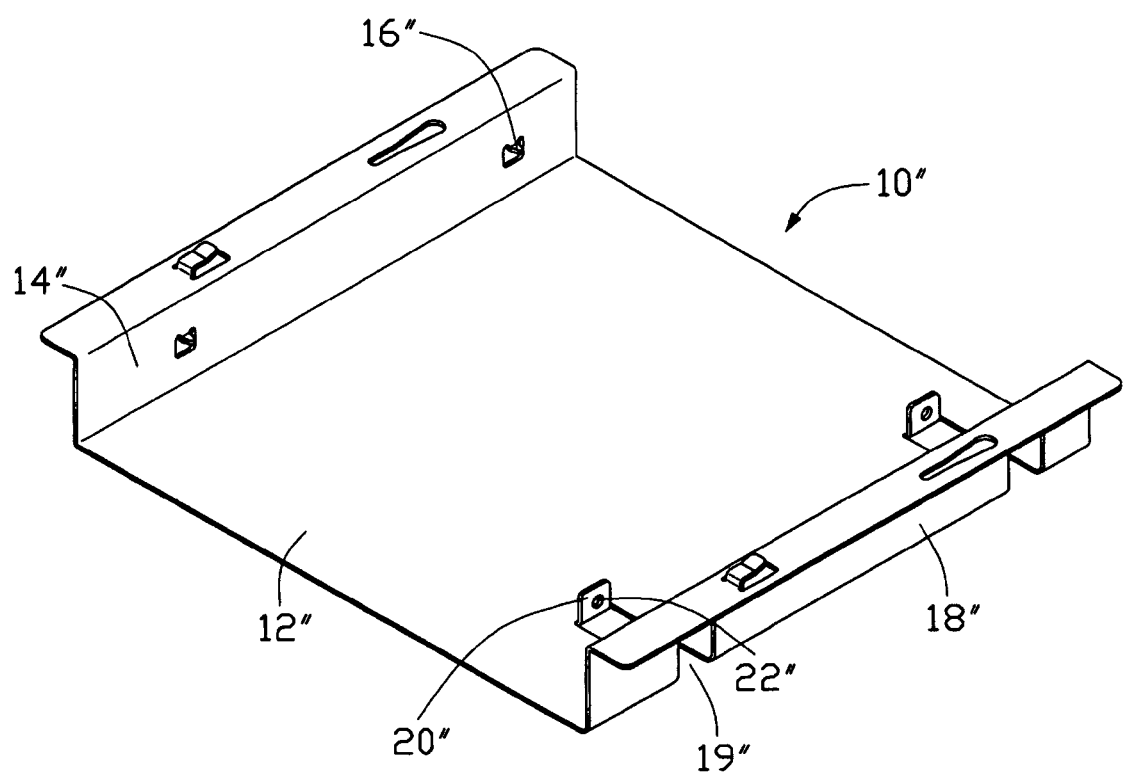
FIG. 6 is an isometric view of a mounting bracket in accordance with a further alternative embodiment of the present invention.

FIG. 6 shows a mounting bracket 10" in accordance with the further alternative embodiment of the present invention. The mounting bracket 10" comprises a bottom wall 12", a first sidewall 14" extending perpendicularly from an edge of the bottom wall 12", and two locating pins 16" protruding inwardly from the first sidewall 14". A second sidewall 18" extends perpendicularly from an opposite edge of the bottom wall 12". Two fixing tabs 20" extend upwardly from the bottom wall 12", parallel to and spaced from the second sidewall 18". Each fixing tab 20" defines a through hole 22", corresponding to a respective one of the fixing holes (not visible) of the first wall 36 of the disk drive 30. A pair of L-shaped grooves 19" is defined in the bottom wall 12", spanning from the respective fixing tabs 20" to the second sidewall 18".

In assembly, the disk drive 30 is placed in the mounting bracket 10", and the locating pins 16" of the mounting bracket 10" are inserted into the fixing holes of the first sidewall of the disk drive 30. A top of the disk drive 30 near the second sidewall 18" is pressed until the second wall 38 of the disk drive 30 abuts the second sidewall 18" of the mounting bracket 10", and the first wall 36 of the disk drive 30 abuts the fixing tabs 20" of the mounting bracket 10". In this position, the fixing holes of the first wall 36 of the disk drive 30 are aligned with the corresponding through holes 22" of the fixing tabs 20" respectively. Fasteners such as screws are extended through the through holes 22" and engaged in the corresponding fixing holes of the disk drive 30, thereby securing the disk drive 30 in the mounting bracket 10". Electromagnetic radiation is not liable to leak out from the mounting bracket 10" since the first sidewall of the disk drive 30 abuts the first sidewall 14" of the mounting bracket 10", and the second wall 38 of the disk drive 30 abuts the second sidewall 18" of the mounting bracket 10".

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mounting apparatus assembly comprising:
    a storage device defining two opposite side faces with a plurality of fixing holes in at least one of said side faces; and
    a mounting bracket comprising:
    a bottom wall;
    opposite first and second side walls extending from two opposite side edges of the bottom wall, said storage device being seated upon the bottom wall with the two side faces respectively engaged with the corresponding side walls of the bracket; and
    a plurality of locating pins extending inwardly from the first side wall and received in the corresponding fixing holes, respectively; wherein
    said mounting bracket further includes a plurality of fixing structures located oppositely far away from the first side wall and fixing said storage device relative to the bracket, wherein
    at least one of said first and second side walls is outwardly deflectable relative to the bottom wall for downward loading the storage device into the bracket;
    wherein the second side wall comprises a first vertical wall, a second vertical wall and a horizontal connecting wall connecting the first and second vertical walls.

2. The mounting apparatus assembly as described in claim 1, wherein the fixing structures comprise at least one through hole defined in the second side wall.

3. The mounting apparatus assembly as described in claim 1, wherein the second side wall perpendicularly extends from the bottom wall of the mounting bracket, parallel to the first side wall.

4. The mounting apparatus assembly as described in claim 3, wherein each of the fixing structures comprises a fixing tab extending from the bottom wall, parallel to and spaced from the second side wall, and the fixing tab has a through hole corresponding to the fixing hole defined in the opposite side face of the storage device.

5. The mounting apparatus assembly as described in claim 1, wherein the fixing structure comprises at least one protrusion protruding from second side wall of the mounting bracket.

6. The mounting apparatus assembly as described in claim 5, wherein the protrusion abuts against a top of the storage device to prevent the storage device from upwardly deflecting.

* * * * *